W. W. BROWER.
LOADING APPARATUS.
APPLICATION FILED APR. 8, 1912.
1,064,126.
Patented June 10, 1913.
2 SHEETS—SHEET 1.
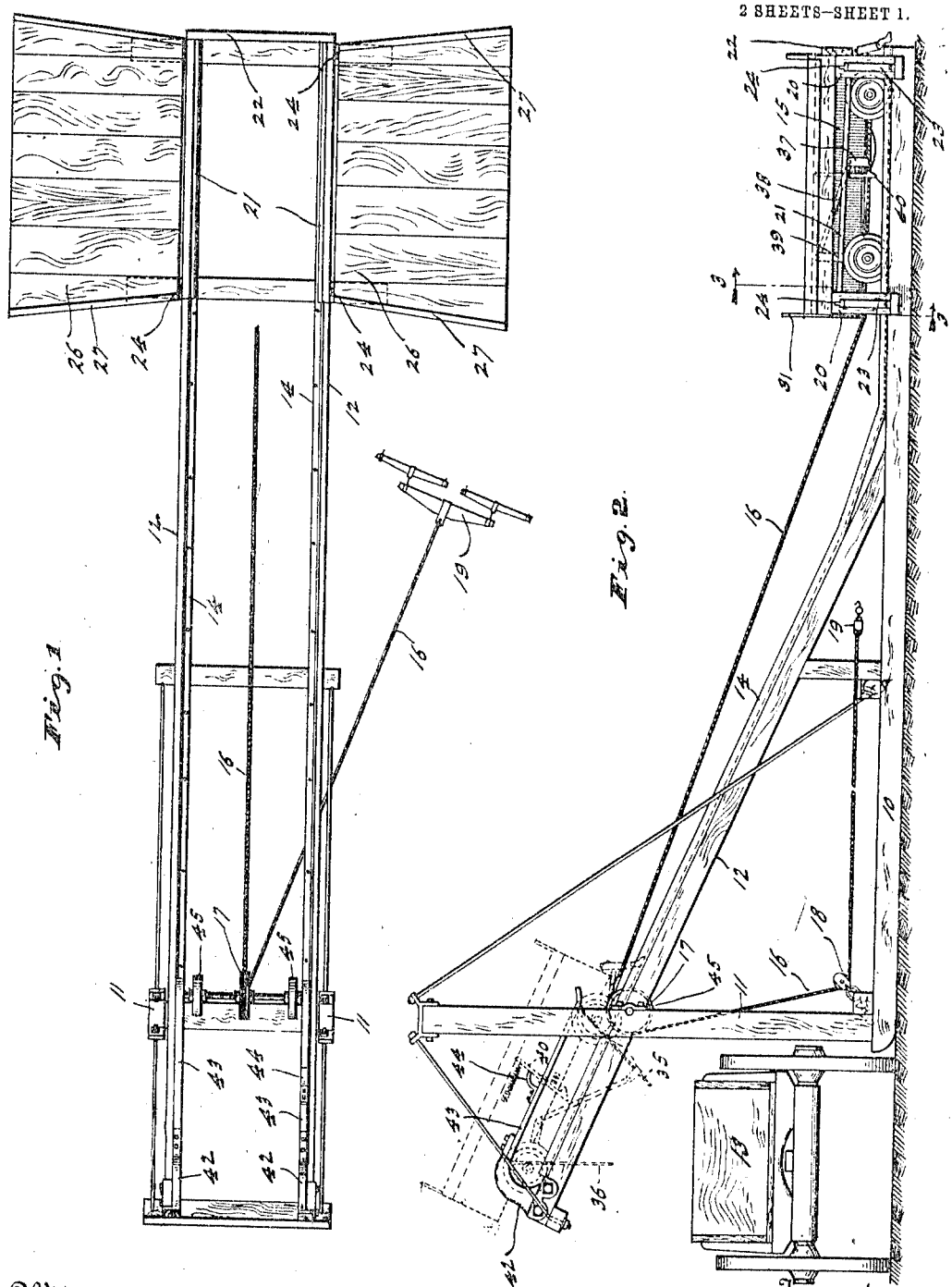
Witnesses
Frank A. Fahle
May Layden
Inventor
William W. Brower,
by Arthur M. Hood
Attorney W. W. BROWER.
LOADING APPARATUS.
APPLICATION FILED APR. 8, 1912.
1,064,126.
Patented June 10, 1913.
2 SHEETS—SHEET 2.
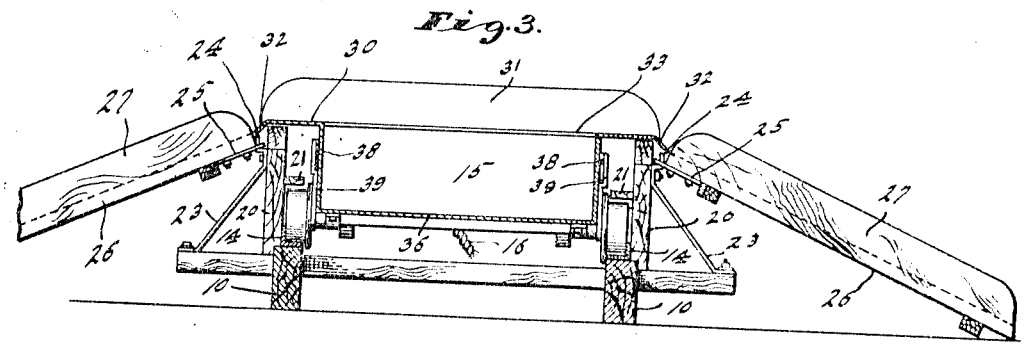
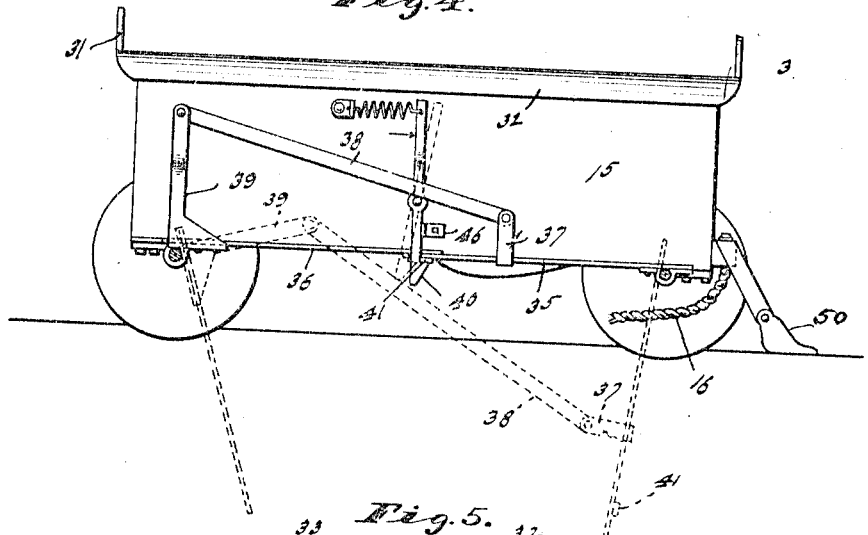
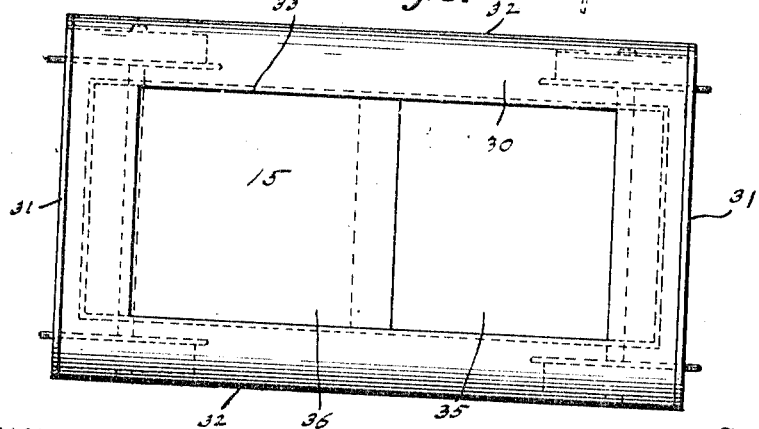
Witnesses
Inventor
William W. Brower
Attorney

UNITED STATES PATENT OFFICE.

WILLIAM W. BROWER, OF BELMOND, IOWA.

LOADING APPARATUS.

1,064,126.   Specification of Letters Patent.   Patented June 10, 1913.

Application filed April 8, 1912. Serial No. 689,388.

*To all whom it may concern:*

Be it known that I, WILLIAM W. BROWER, a citizen of the United States, residing at Belmond, in the county of Wright and State of Iowa, have invented a new and useful Loading Apparatus, of which the following is a specification.

It is the object of this invention, which is an improvement on that shown in my prior Patent No. 936,517, to provide for conveniently and easily elevating and loading material into a vehicle by means which is readily transportable and easily prepared for use.
The various novel features of my invention will appear from the description and drawings, and will be particularly pointed out in the claims.

In the drawings, Figure 1 is a plan view of a device embodying my invention, the loading car being removed; Fig. 2 is a side elevation of the same device, showing a vehicle in position for loading and with one of the inclined ways removed to show the loading car; Fig. 3 is a section on the line 3—3 of Fig. 2, the loading car also being in section; Fig. 4 is a side elevation of the car, with the nearer wheels removed and the axles in section; and Fig. 5 is a plan of the loading car.

The apparatus is supported on the runners 10, on which it may easily be slid from place to place. Uprights 11 are mounted on one end of the runners 10, and with the latter support an inclined trackway 12. The upper end of the trackway projects beyond the corresponding ends of the runners 10 and is at a sufficient height to allow a wagon 13 to be placed beneath it. Track rails 14 are mounted on the inclined trackway 12, and on the runners 10 beyond the lower end of such trackway. A loading car 15 is mounted on the track 14, and may be operated in any suitable manner. Conveniently, a rope 16 is fastened to the rear end of the car 15 and extends under it, along the trackway 12, over a pulley 17 at the junction of the uprights 11 and trackway 12, and over a pulley 18 at the junction of such uprights and the runners 10, terminating in a doubletree 19, thus providing for the convenient operation of the car 15 by horses.

The car 15 when at the lower or horizontal end of the track 14 is between uprights 20, which support strips 21 projecting over the wheels of the car 15 to prevent such wheels from being raised. The uprights 20 also support a cross bar 22 which serves as a stop to limit the movement of the car 15 toward the horizontal end of the track. Suitable braces 23 brace the uprights 20, and at their upper end terminate in hooks 24 for receiving suitably perforated members 25 on the upper ends of removable inclined ways 26. These inclined ways are provided with side guides 27, which converge slightly at the upper ends of the ways and are there spaced apart a distance substantially equal to the length of the car 15. The car is provided with a platform top 30 the ends of which are turned upward to provide guide flanges 31 which substantially register with the guides 27 when the car is at one extreme of its movement. The sides of the top 30 barely clear the top of the uprights 20, and are turned down slightly at 32. The top 30 is cut away over the car body 15 to provide an opening 33 through which the car is loaded. This loading is conveniently accomplished by ordinary two-horse scrapers. The two horses separate and pass on the ground along opposite sides of the inclined ways 26 and opposite ends of the car 15, one horse crossing the track; and the scraper is pulled by them up one inclined way 26, onto the cover 30 of the car, where its load is dumped through the opening 33, and down the other inclined way 26. The distance between the guides 31 is enough greater than the width of the scraper to provide easy clearance, and the dimension of the opening 33 lengthwise of the car is less than the width of the scraper.

The bottom of the car 15 is composed of two overlapping leaves 35 and 36 pivoted on the two car axles respectively. On each side of the car a rigid arm 37 projecting upward from the leaf 35 is connected by a link 38 to a rigid arm 39 projecting upward from the leaf 36 at its pivotal end. The two leaves are normally held closed by a spring latch 40 pivoted on each side of the car and engaging a cross bar 41 on the under leaf 35.

When the horses attached to the doubletree 19 have brought the car 15 to the top of the inclined track 14, or to the dotted line position shown in Fig. 2, the front car wheels are stopped by the buffers 42. Each buffer may support a bar 43 extending over the car wheels when the buffers stop the car and preventing the latter from tipping.

As the car reaches the upper end of its movement, the latch 40 is released by a finger 44, conveniently mounted on the bar 43. This allows the levers 35 and 36 to swing downwardly, and the load of dirt or other material contained in the car to fall out into the wagon 13. When the rope 16 is slackened, the car 15 slides down the inclined trackway by the action of gravity. As the car starts downward, rollers 45, conveniently mounted on the same axis as the pulley 17, engage the leaf 35 and force it upward so that the cross bar 41 will again be engaged by the latches 40 which are held in proper position for such engagement by the stops 46. By reason of the arms 37 and 39 and the link 38, the upward movement of the leaf 35 also raises the leaf 36, so that the two leaves forming the car bottom are automatically brought to closed position. The car can again be loaded when it has reached the bottom of the track, and can then again be drawn to the top of the track and automatically dumped by the opening of the two-leafed bottom. To keep the track clear, the car may be provided with plows or shoes 50 located in front of the car wheels, when the car is traveling in one or both directions.

To move the loading apparatus it is only necessary to lift the inclined ways 26 from the hooks 24, and to draw the apparatus, as by horses, on its runners 10 to any desired position. Here the inclined ways 26 may be easily replaced and the apparatus thus again be put in condition for use.

I claim as my invention:

1. The combination, in an elevating and loading mechanism, of a frame having an inclined trackway, a car mounted on said trackway, said car having a platform top with an opening into the body of the car, and an inclined way attached to each side of said frame at the lower end of the trackway and leading to said top when the car is at the lower end of said trackway so that dirt-moving means may pass upon said top and discharge through said opening.

2. The combination, in an elevating and loading mechanism, of a frame having an inclined trackway, a car mounted on said trackway, said car having a platform top with an opening into the body of the car and a drop bottom, and an inclined way attached to each side of said frame at the lower end of the trackway and leading to said top when the car is at the lower end of said trackway so that dirt-moving means may pass upon said top and discharge through said opening.

3. The combination, in an elevating and loading mechanism, of a frame having an inclined trackway, a car mounted on said trackway, said car having a platform top with an opening into the body of the car, and a removable inclined way attached to each side of said frame at the lower end of the trackway and leading to said top when the car is at the lower end of said trackway so that dirt-moving means may pass upon said top and discharge through said opening.

4. The combination, in an elevating and loading mechanism, of a frame having an inclined trackway, a car mounted on said trackway, said car having a platform top with an opening into the body of the car and a drop bottom, and a removable inclined way attached to each side of said frame at the lower end of the trackway and leading to said top when the car is at the lower end of said trackway so that dirt-moving means may pass upon said top, and discharge through said opening.

5. The combination, in an elevating and loading mechanism, of a frame having an inclined trackway, a car mounted on said trackway, said car having a top with guides at the ends and with an opening into the body of the car of less length than the distance between such guides, and an inclined way attached to each side of said frame at the lower end of the trackway and leading to said top when the car is at the lower end of said trackway so that dirt-moving means may pass upon said top and discharge through said opening.

6. The combination, in an elevating and loading mechanism, of a frame having an inclined trackway, a car mounted on said trackway, said car having a top with guides at the ends and with an opening into the body of the car of less length than the distance between such guides and also having a drop bottom, and an inclined way attached to each side of said frame at the lower end of the trackway and leading to said top when the car is at the lower end of said trackway so that dirt-moving means may pass upon said top and discharge through said opening.

7. The combination, in an elevating and loading mechanism, of a frame having an inclined trackway, a car mounted on said trackway, said car having a top with guides at the ends and with an opening into the body of the car of less length than the distance between such guides, and a removable inclined way attached to each side of said frame at the lower end of the trackway and leading to said top when the car is at the lower end of said trackway so that dirt-moving means may pass upon said top and discharge through said opening.

8. The combination, in an elevating and loading mechanism, of a frame having an inclined trackway, a car mounted on said trackway, said car having a platform top with an opening into the body of the car, and a drop bottom comprising a pair of interconnected leaves, and an inclined way attached to each side of said frame at the lower end of the trackway and leading to said top when the car is at the lower end of said trackway so that dirt-moving means may pass upon said top and discharge through said opening.

9. The combination, in a lifting and loading mechanism, of a frame having an inclined trackway, a car mounted on said trackway, said car having a drop bottom comprising a pair of interconnected leaves, a catch for holding said drop bottom in closed position, means at one end of the trackway for releasing said catch when the car reaches that end of the trackway, and a roller near that end of the trackway for reclosing the drop bottom as the car is moved away from that end of the trackway.

10. The combination, in a lifting and loading mechanism, of a frame having an inclined trackway, a car mounted on said trackway, said car having a drop bottom, a catch for holding said drop bottom in closed position, means at one end of the trackway for releasing said catch when the car reaches that end of the trackway, and a roller near that end of the trackway for reclosing the drop bottom as the car is moved away from that end of the trackway.

11. The combination, in a lifting and loading mechanism, of a frame having an inclined trackway, a car mounted on said trackway, said car having a drop bottom comprising a pair of interconnected leaves, a catch for holding said drop bottom in closed position, means at the upper end of the trackway for releasing said catch when the car reaches that end of the trackway, a roller near the upper end of the trackway for reclosing the drop bottom as the car is moved downward from the upper end of the trackway, and a rope attached to the end of the car remote from the upper end of the trackway and passing under the car and over a pulley removed from the upper end of the trackway by substantially the same distance as is such roller.

12. The combination, in a lifting and loading mechanism, of a frame having an inclined trackway, a car mounted on said trackway, said car having a drop bottom, a catch for holding said drop bottom in closed position, means at the upper end of the trackway for releasing said catch when the car reaches that end of the trackway, a roller near the upper end of the trackway for reclosing the drop bottom as the car is moved downward from the upper end of the trackway, and a rope attached to the end of the car remote from the upper end of the trackway and passing under the car and over a pulley removed from the upper end of the trackway by substantially the same distance as is such roller.

In witness whereof, I, have hereunto set my hand and seal at Belmond, Iowa, this fourth day of April, A. D. one thousand nine hundred and twelve.

WILLIAM W. BROWER. [L. S.]

Witnesses:
 JNO. BERG,
 A. L. LUICY.